(12) United States Patent
Lei et al.

(10) Patent No.: US 10,968,917 B2
(45) Date of Patent: Apr. 6, 2021

(54) BLOWER COMPRISING A PRESSURE MEASURING CONNECTOR

(71) Applicant: Zhongshan Broad-Ocean Motor Manufacturing Co., Ltd., Zhongshan (CN)

(72) Inventors: Wei Lei, Zhongshan (CN); Kunpan Liu, Zhongshan (CN); Shikun Chen, Zhongshan (CN); Shenglong Guo, Zhongshan (CN); Xianjun Liu, Zhongshan (CN); Jianhua Zeng, Zhongshan (CN); Qixiang Xiang, Zhongshan (CN); Xiao Liu, Zhongshan (CN); Zeyan Jiang, Zhongshan (CN); Haoquan Zhou, Zhongshan (CN)

(73) Assignee: ZHONGSHAN BROAD-OCEAN MOTOR MANUFACTURING CO., LTD., Zhongshan (CN)

(*) Notice: Subject to any disclaimer, the term of this patent is extended or adjusted under 35 U.S.C. 154(b) by 768 days.

(21) Appl. No.: 15/361,360

(22) Filed: Nov. 25, 2016

(65) Prior Publication Data
US 2017/0074273 A1   Mar. 16, 2017

Related U.S. Application Data

(63) Continuation-in-part of application No. PCT/CN2015/077130, filed on Apr. 21, 2015, and a (Continued)

(30) Foreign Application Priority Data

Oct. 27, 2014 (CN) .......................... 201420630144.0
Dec. 26, 2014 (CN) .......................... 201420849518.8

(51) Int. Cl.
*F04D 27/00* (2006.01)
*F04D 17/16* (2006.01)
(Continued)

(52) U.S. Cl.
CPC ........... *F04D 27/001* (2013.01); *F04D 17/16* (2013.01); *F04D 29/4226* (2013.01); *G01L 11/00* (2013.01)

(58) Field of Classification Search
CPC .... F04D 27/001; F04D 17/16; F04D 29/4226; G01L 11/00
(Continued)

(56) References Cited

U.S. PATENT DOCUMENTS 4,277,222 A * 7/1981 Barbeau .................. F01D 5/046
                                                       415/174.5
5,586,861 A * 12/1996 Berger .................... F04D 27/00
                                                       415/118

(Continued)

FOREIGN PATENT DOCUMENTS

CA           3005534 A1 * 11/2018  ........... F04D 27/001

*Primary Examiner* — Charles G Freay
(74) *Attorney, Agent, or Firm* — Matthias Scholl P.C.; Matthias Scholl (57) ABSTRACT

A blower, including a scroll casing, a fan impeller, a motor, and a pressure measuring connector. The scroll casing includes a chamber, an air inlet, and an air outlet. The air inlet and the air outlet communicate with the chamber. The motor is disposed on the scroll casing. A drive end of the motor is inserted into the chamber and is connected to the fan impeller. The pressure measuring connector is disposed on the scroll casing. A channel is disposed in the pressure measuring connection, and the channel communicates with the chamber. The channel includes a first subchannel and a second subchannel. The first subchannel communicates with the second subchannel, and an inner diameter of the first subchannel is larger than an inner diameter of the second subchannel.

8 Claims, 7 Drawing Sheets

Related U.S. Application Data continuation-in-part of application No. PCT/CN2015/077134, filed on Apr. 21, 2015.

(51) Int. Cl.
*F04D 29/42* (2006.01)
*G01L 11/00* (2006.01)

(58) Field of Classification Search
USPC .......................... 73/756; 415/174.5, 170.12
See application file for complete search history.

(56) References Cited

U.S. PATENT DOCUMENTS

| | | | | |
|---|---|---|---|---|
| 6,238,179 B1 * | 5/2001 | Wunderwald | ......... | F04D 29/162 |
| | | | | 415/110 |
| 6,575,026 B1 * | 6/2003 | DeBar | ........................ | G01L 7/20 |
| | | | | 73/202 |
| 6,843,121 B1 * | 1/2005 | DeBar | ..................... | B41J 2/175 |
| | | | | 73/202 |
| 7,189,062 B2 * | 3/2007 | Fukizawa | ................ | F04D 25/04 |
| | | | | 416/185 |
| 8,226,353 B2 * | 7/2012 | Argaud | ................... | F01D 5/046 |
| | | | | 415/116 |
| 8,360,712 B2 * | 1/2013 | Deo | ........................ | F01D 11/02 |
| | | | | 415/1 |
| 2013/0216377 A1 * | 8/2013 | Wang | .................... | F04D 29/102 |
| | | | | 415/230 |

\* cited by examiner

BLOWER COMPRISING A PRESSURE MEASURING CONNECTOR

CROSS-REFERENCE TO RELATED APPLICATIONS

This application is a continuation-in-part of International Patent Application No. PCT/CN2015/077130 with an international filing date of Apr. 21, 2015, and of International Patent Application No. PCT/CN2015/077134 with an international filing date of Apr. 21, 2015 designating the United States, now pending, and further claims priority benefits to Chinese Patent Application No. 201420630144.0 filed Oct. 27, 2014, and to No. 201420849518.8 filed Dec. 26, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to a blower.

Description of the Related Art

The pressure measuring connector is an important part of a blower for security control. In general, the larger the pressure at the pressure measuring connector, the higher the safety coefficient of the loaded blower.

Figure 1:
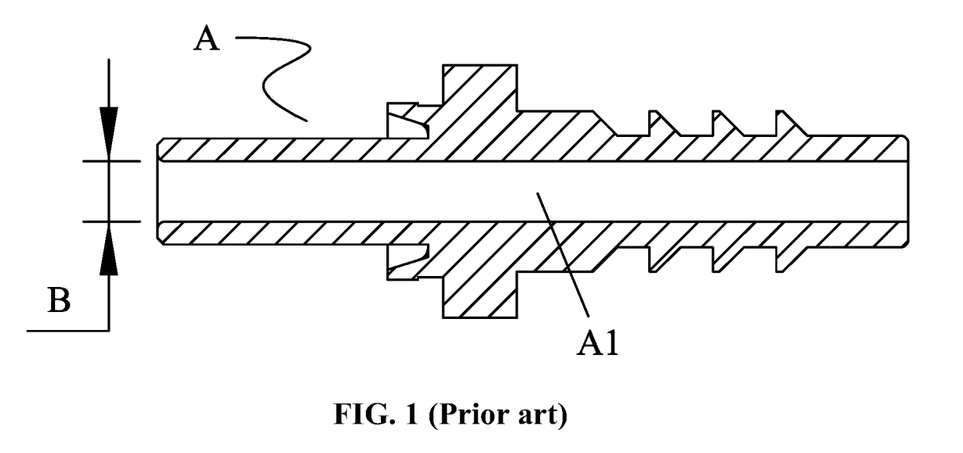
FIG. 1 is a schematic diagram of a typical pressure measuring connector.
Figure 2:
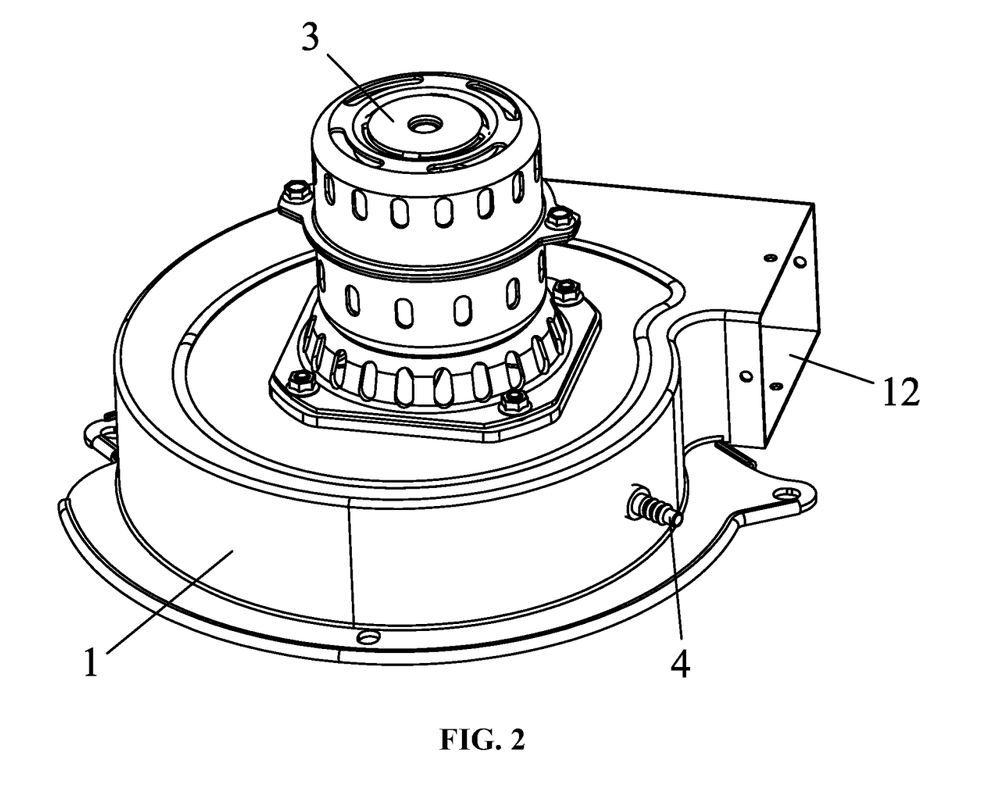
FIG. 2 is a stereogram of a blower in Example 1.
Figure 3:
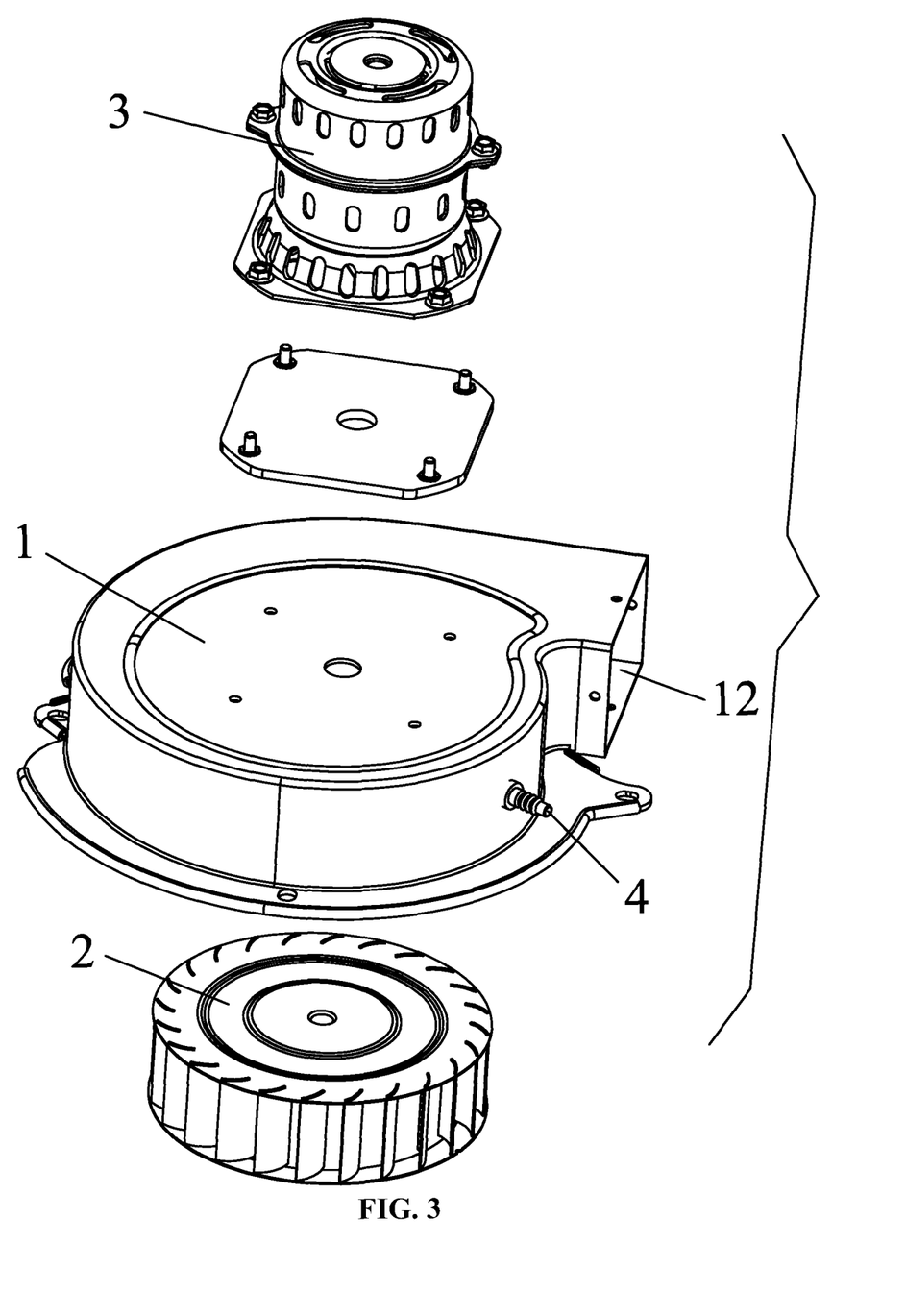
FIG. 3 is an exploded view of a blower in Example 1.
Figure 4:
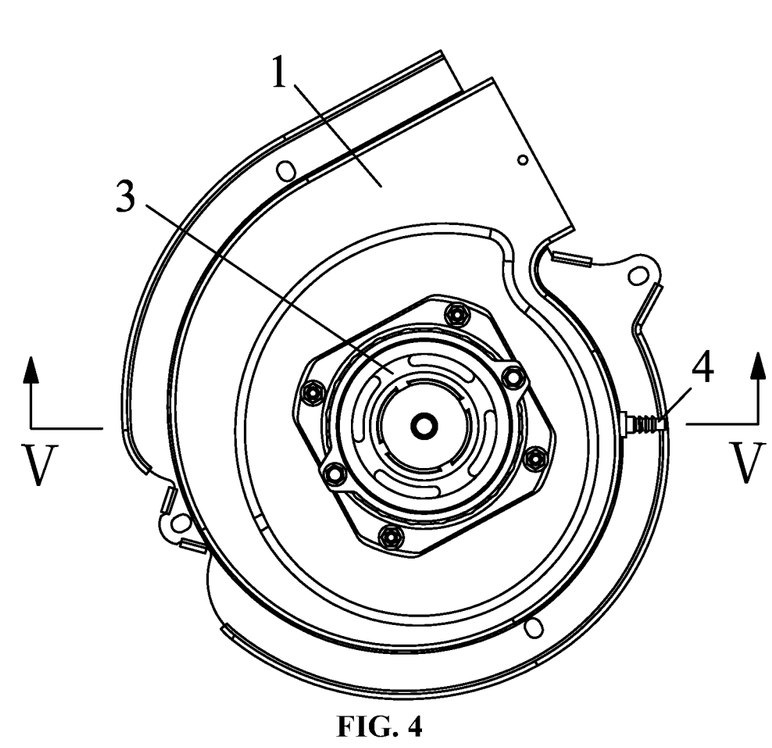
FIG. 4 is top view of a blower in Example 1.
Figure 5:
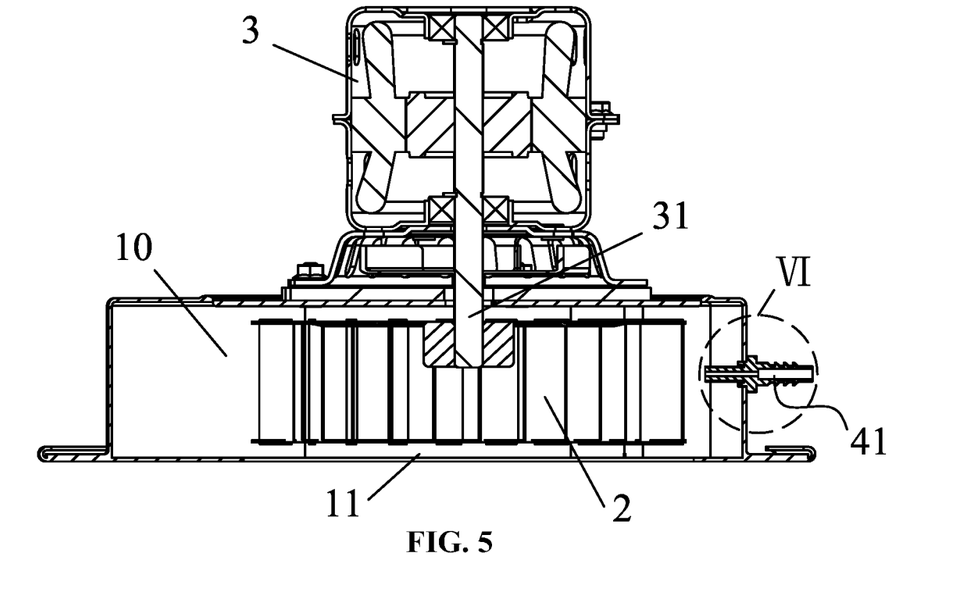
FIG. 5 is a cross-sectional view taken from line V-V in FIG. 4.
Figure 6:
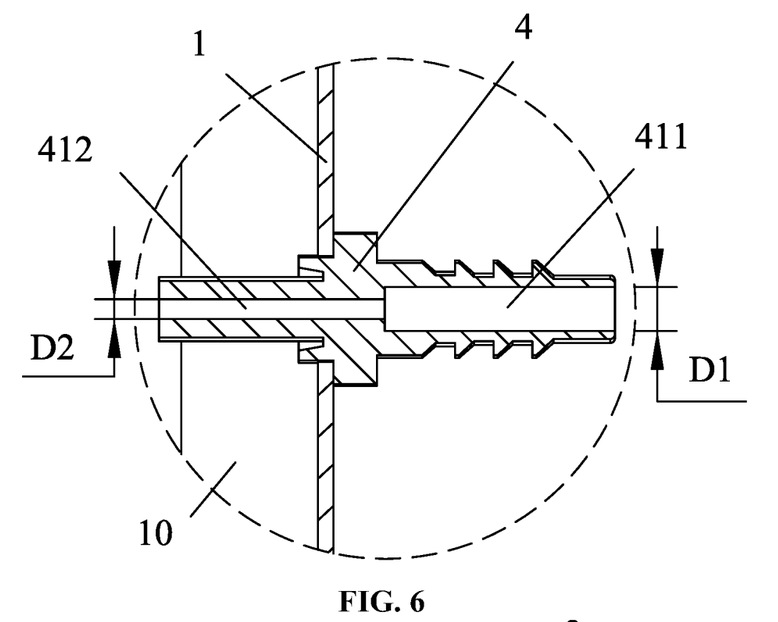
FIG. 6 is a partial enlarged view taken from VI-VI part in FIG. 5.
Figure 7:
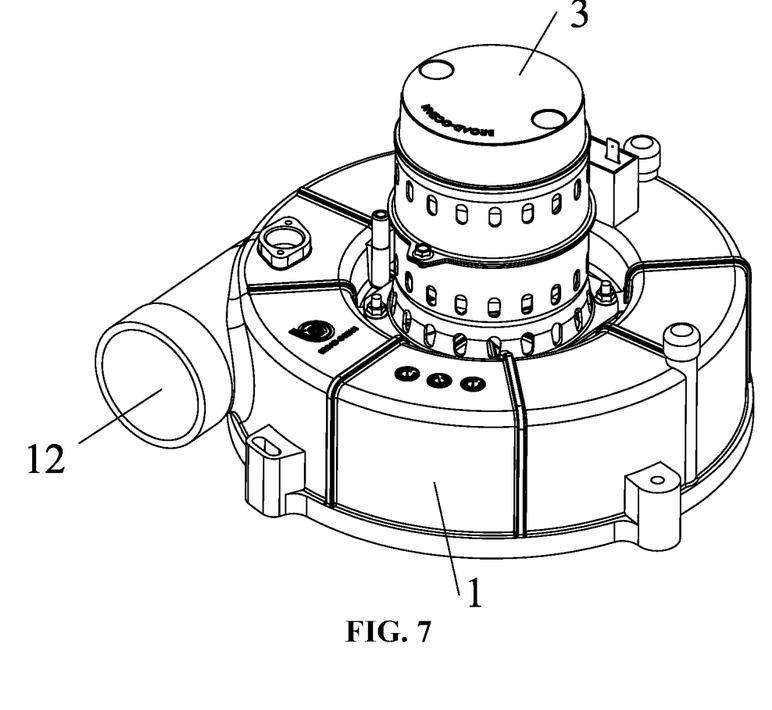
FIG. 7 is a stereogram of a blower in Example 2.
Figure 8:
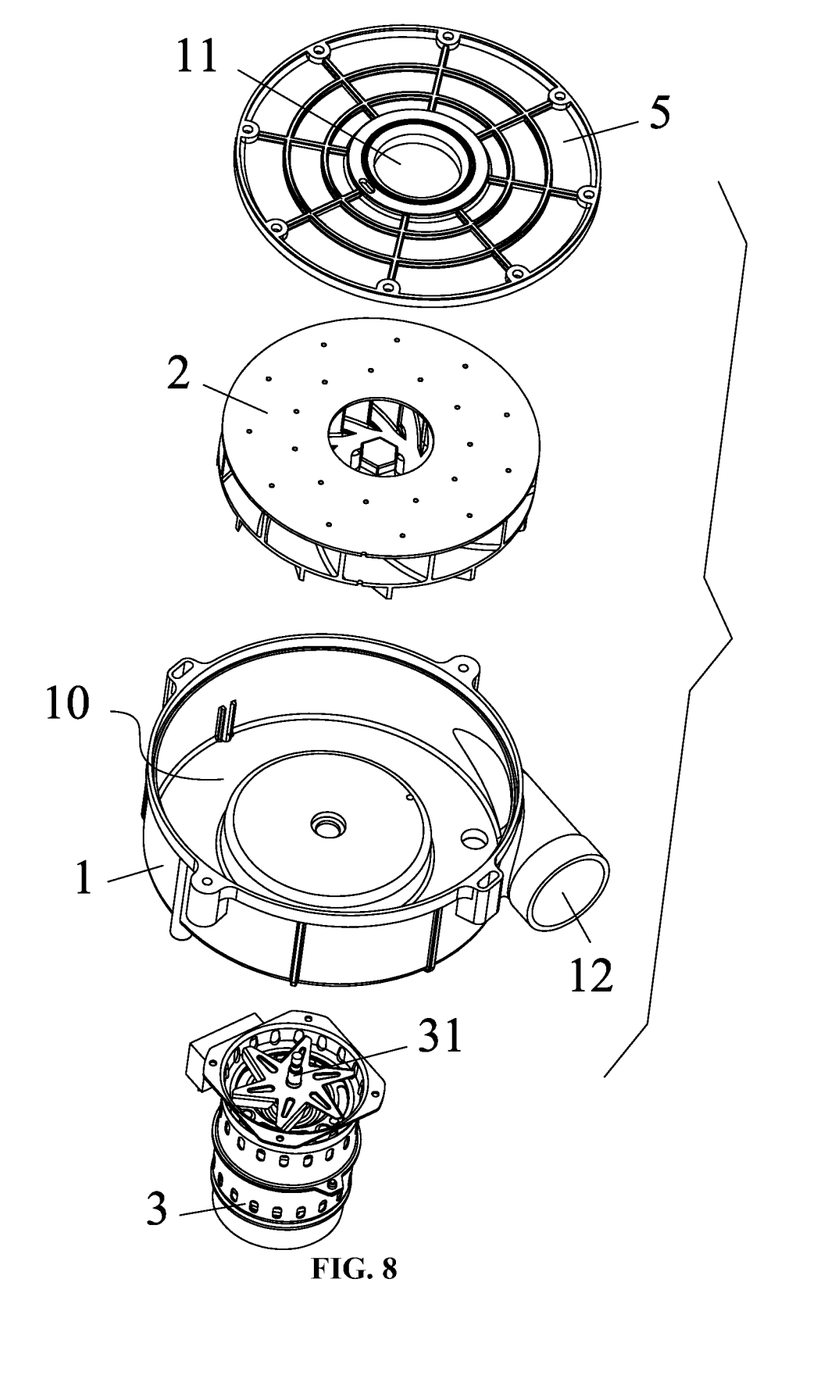
FIG. 8 is an exploded view of a blower in Example 2.
Figure 9:
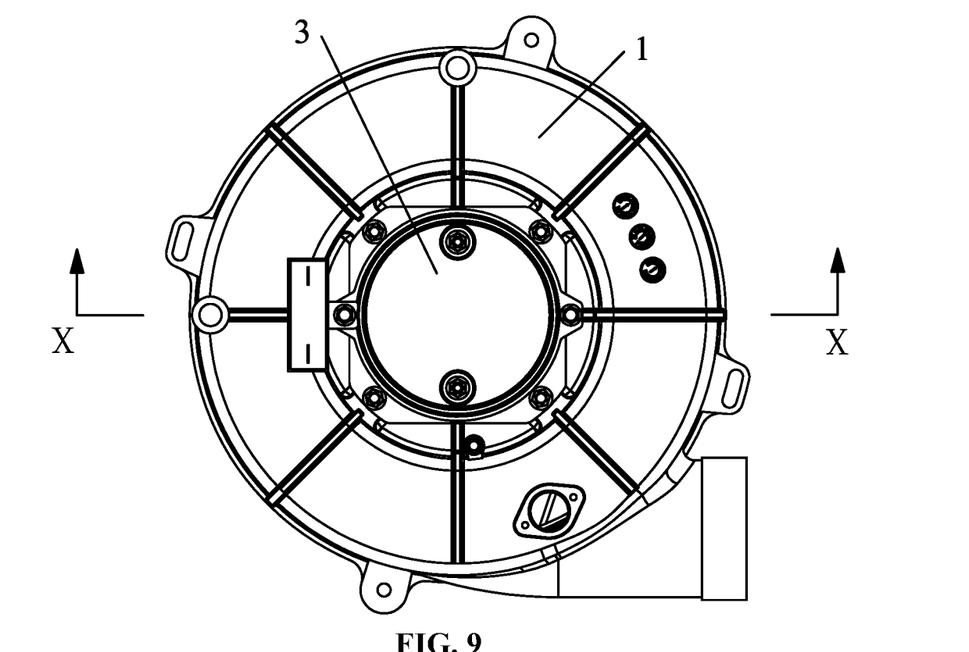
FIG. 9 is a top view of a blower in Example 2.
Figure 10:
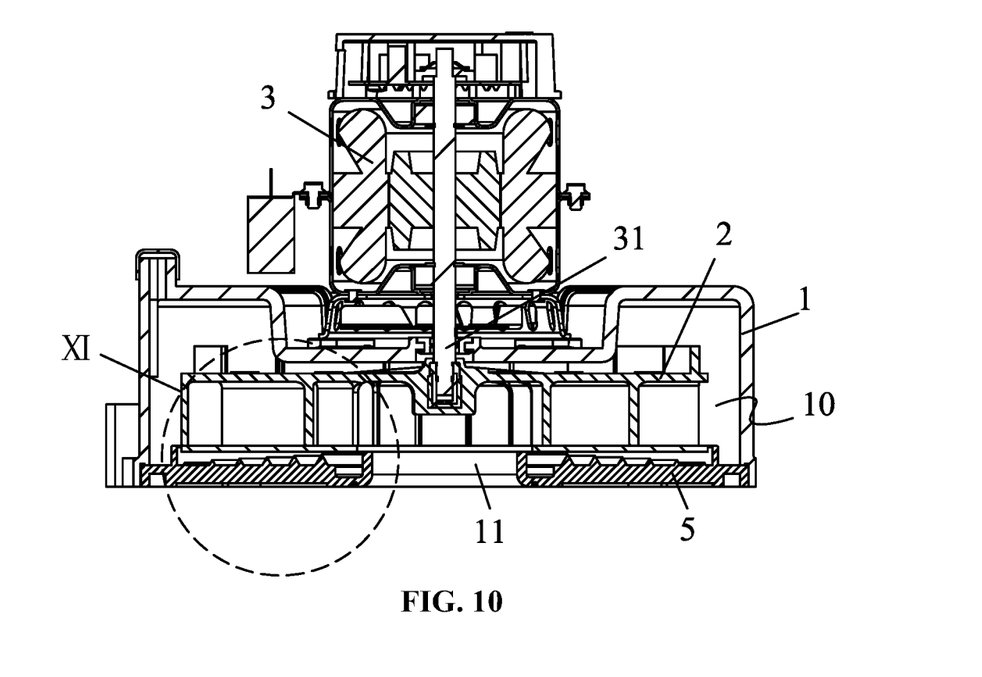
FIG. 10 is a cross-sectional view taken from line X-X in FIG. 9.
Figure 11:
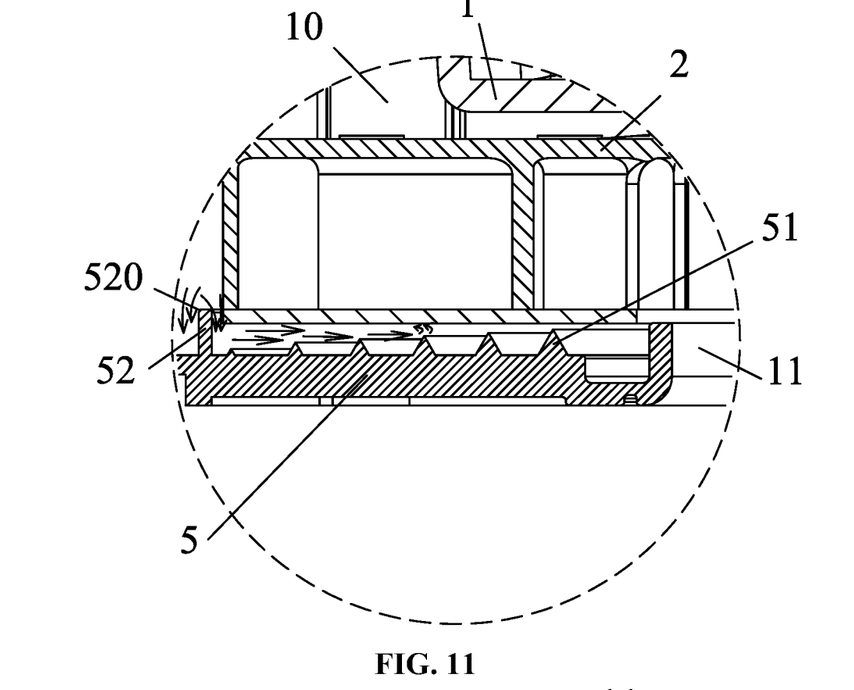
FIG. 11 is a partial enlarged view taken from XI-XI part in FIG. 10.
Figure 12:
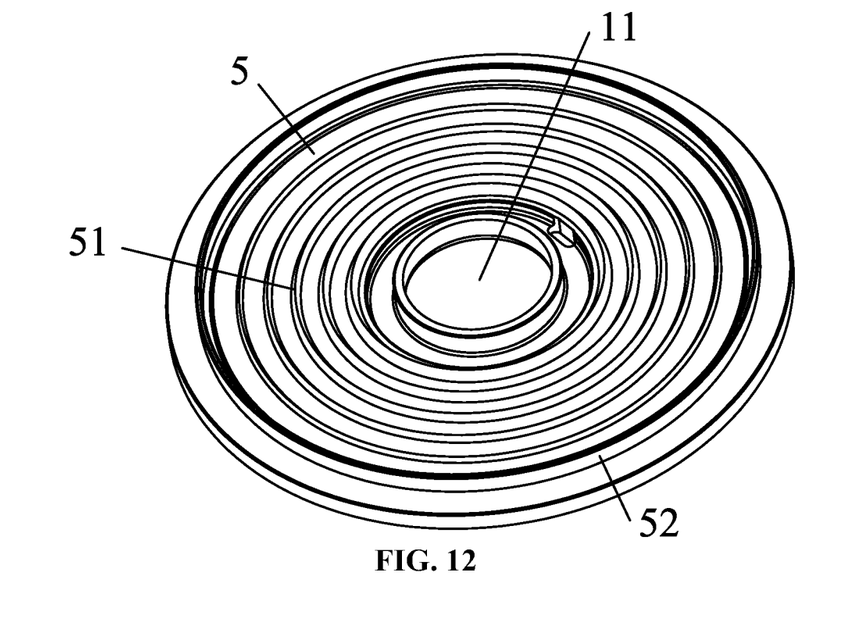
FIG. 12 is a stereogram of a cover plate in Example 2.

As shown in FIG. 1, a conventional pressure measuring connector A includes a channel A1 having uniform inner diameter B, and thus the pressures at the outlet and the inlet of the pressure measuring connector are the same and cannot be increased. This adversely affects the safety coefficient of the loaded blower.

SUMMARY OF THE INVENTION

In view of the above-described problems, it is one objective of the invention to provide a blower. Using the blower, on the basis of Bernoulli's theorem and Venturi effect, the pressure at a pressure measuring connector of the blower is effectively increased, thus improving the safety coefficient of the blower in a loaded state.

To achieve the above objective, in accordance with one embodiment of the invention, there is provided a blower, comprising a scroll casing, a fan impeller, a motor, and a pressure measuring connector. The scroll casing comprises a chamber, an air inlet, and an air outlet. The air inlet and the air outlet communicate with the chamber. The motor is disposed on the scroll casing. A drive end of the motor is inserted into the chamber and is connected to the fan impeller. The pressure measuring connector is disposed on the scroll casing. A channel is disposed in the pressure measuring connection, and the channel communicates with the chamber. The channel comprises a first subchannel and a second subchannel. The first subchannel communicates with the second subchannel, and an inner diameter of the first subchannel is larger than an inner diameter of the second subchannel.

In a class of this embodiment, the first subchannel is disposed at an outer side of the scroll casing. The second subchannel is inserted into the chamber being at an inner side of the scroll casing.

In a class of this embodiment, the pressure measuring connector is adapted to connect to an external load. An air switch on the external load monitors static pressure of the first subchannel.

In a class of this embodiment, the pressure measuring connector is disposed on a side wall of the scroll casing.

In a class of this embodiment, a ratio of the inner diameter of the first subchannel to the inner diameter of the second subchannel ranges from 1.05 to 3.0.

In a class of this embodiment, a bottom of the scroll casing is provided with a cover plate. The air inlet is disposed on the central part of the cover plate. The air outlet is disposed on a side surface of the scroll casing. A plurality of annular lug bosses is disposed on an inner side wall surface of the cover plate and centers around the air inlet.

In a class of this embodiment, a height of the annular lug bosses is gradually decreased from a center of the cover plate to an outer edge of the cover plate.

In a class of this embodiment, a cross-section of the annular lug bosses is triangular or trapezoidal.

In a class of this embodiment, an outer edge of the inner side wall surface of the cover plate is provided with an annular baffle. A bottom of the fan impeller is inserted into the annular baffle.

In a class of this embodiment, a top of the annular baffle is provided with a filleted corner.

Advantages of the blower according to embodiments of the invention are summarized as follows:

1. A channel is disposed in the pressure measuring connection, and the channel communicates with the chamber. The channel comprises a first subchannel and a second subchannel. The first subchannel communicates with the second subchannel, and an inner diameter of the first subchannel is larger than an inner diameter of the second subchannel. When the motor drives the fan impeller to rotate, negative pressure is generated inside the chamber of the scroll casing, thus the air outside the scroll casing enters into the chamber via the pressure measuring connector. According to the Bernoulli's theorem, within one channel, areas having larger inner diameters have slower flow velocity inside and greater static pressure, leading to the Venturi effect. Because the inner diameter of the first subchannel is greater than the inner diameter of the second subchannel, the first subchannel has greater static pressure, thus effectively improving the security of the loaded blower.

2. The ratio of the inner diameter of the first subchannel to the inner diameter of the second subchannel ranges from 1.05 to 3.0, causing an obvious Venturi effect inside the pressure measuring connector, thus the pressure at the pressure measuring connector is increased, and the security of the loaded blower is improved.

3. A plurality of annular lug bosses are disposed on an inner side wall surface of the cover plate and centers around the air inlet, effectively reducing gas leakage between the fan impeller and the cover plate, thereby improving the blowing efficiency of the blower.

4. The height of the annular lug bosses is gradually decreased from a center of the cover plate to an outer edge of the cover plate. Jitter of the fan impeller gets obvious near the outer edge of the fan impeller, in order to reduce the mechanical friction between the fan impeller and the cover plate caused by jitter, the height of the annular lug bosses is gradually decreased from the center of the cover plate to the outer edge of the cover plate.

5. An outer edge of the inner side wall surface of the cover plate is provided with an annular baffle. A bottom of the fan impeller is inserted into the annular baffle, so as to prevent the airflow from entering into the gap between the scroll casing and the fan impeller, further reducing gas leakage between the fan impeller and the cover plate, thereby improving the blowing efficiency of the blower.

6. The top of the annular baffle is provided with a filleted corner, thus reducing noise.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a blower are described below. It should be noted that the following examples are intended to describe and not to limit the invention.

Example 1

As shown in FIGS. 2-6, a blower comprises a scroll casing 1, a fan impeller 2, a motor 3, and a pressure measuring connector 4. The scroll casing 1 comprises a chamber 10, an air inlet 11 and an air outlet 12. The air inlet 11 and the air outlet 12 communicate with the chamber 10. The motor 3 is disposed on the scroll casing 1. A drive end 31 of the motor 3 is inserted into the chamber 10 and is connected to the fan impeller 2. The pressure measuring connector 4 is disposed on a side wall of the scroll casing 1. A channel 41 is disposed in the pressure measuring connector 4, and the channel 41 communicates with the chamber 10. The channel 41 comprises a first subchannel 411 and a second subchannel 412. The first subchannel 411 communicates with the second subchannel 412, and an inner diameter D1 of the first subchannel 411 is larger than an inner diameter D2 of the second subchannel 412. The first subchannel 411 is disposed at an outer side of the scroll casing 1. The second subchannel 412 is inserted into the chamber 10 being at an inner side of the scroll casing 1. The pressure measuring connector 4 is adapted to connect to an external load. An air switch on the external load monitors static pressure of the first subchannel 411. When the motor 3 drives the fan impeller 2 to rotate, negative pressure is generated inside the chamber 10 of the scroll casing 1, thus the air outside the scroll casing 1 enters into the chamber 10 via the pressure measuring connector 4. According to the Bernoulli's theorem, within one channel, areas having greater inner diameters have slower flow velocity inside and greater static pressure, leading to the Venturi effect. Because the inner diameter D1 of the first subchannel 411 is greater than the inner diameter D2 of the second subchannel 412, the first subchannel 411 has greater static pressure, thereby effectively improving the security of the loaded blower, and preventing the air switch on the external load from being readily triggered.

A ratio of the inner diameter D1 of the first subchannel 411 to the inner diameter D2 of the second subchannel 412 ranges from 1.05 to 3.0, causing an obvious Venturi effect inside the pressure measuring connector 4, thus the pressure at the pressure measuring connector is increased, and the security of the loaded blower is improved.

Example 2

As shown in FIGS. 7-12, a blower comprises a motor 3, a scroll casing 1, a cover plate 5, and a fan impeller 2. The scroll casing 1 is integrated with the cover plate 5 to form a chamber 10. The fan impeller 2 is disposed in the chamber 10. The motor 3 is disposed on the scroll casing 1. A drive end 31 of the motor 3 is inserted into the chamber 10 and is connected to the fan impeller 2. An air inlet 11 is disposed on the central part of the cover plate 5. An air outlet 12 is disposed on a side surface of the scroll casing 1. The air inlet 11 and the air outlet 12 communicate with the chamber 10. A plurality of annular lug bosses 51 are disposed on an inner side wall surface of the cover plate 5 and centers around the air inlet 11. A height of the annular lug bosses 51 is gradually decreased from a center of the cover plate 5 to an outer edge of the cover plate 5. The cross-section of the annular lug bosses 51 is triangular. The cross-section of the annular lug bosses 51 is trapezoidal. An outer edge of the inner side wall surface of the cover plate 5 is provided with an annular baffle 52. A bottom of the fan impeller 2 is inserted into the annular baffle 52. The top of the annular baffle 52 is provided with a filleted corner 520.

While particular embodiments of the invention have been shown and described, it will be obvious to those skilled in the art that changes and modifications may be made without departing from the invention in its broader aspects, and therefore, the aim in the appended claims is to cover plate all such changes and modifications as fall within the true spirit and scope of the invention.

The invention claimed is:
1. A blower comprising:
a scroll casing;
a fan impeller;
a motor; and
a pressure measuring connector;
wherein
the scroll casing comprises a chamber, an air inlet, and an air outlet; the air inlet and the air outlet communicate with the chamber;
the motor is disposed on the scroll casing; a drive end of the motor is inserted into the chamber and is connected to the fan impeller;
the pressure measuring connector is disposed on the scroll casing; a channel is disposed in the pressure measuring connector, and the channel communicates with the chamber; and
the channel comprises a first subchannel and a second subchannel; the first subchannel communicates with the second subchannel, and an inner diameter of the first subchannel is larger than an inner diameter of the second subchannel; the first subchannel is disposed at an outer side of the scroll casing, and the second subchannel is disposed within the chamber of the scroll casing;

the channel communicates with air at the outer side of the scroll casing; and when the fan impeller is driven to rotate by the motor, the chamber of the scroll casing has a pressure lower than the pressure at the outer side of the scroll casing, whereby the channel conveys air unidirectionally from the outer side of the scroll casing through the first subchannel to the second subchannel and into the chamber of the scroll casing.

2. The blower of claim 1, wherein the pressure measuring connector is disposed on a side wall of the scroll casing.

3. The blower of claim 1, wherein a ratio of the inner diameter of the first subchannel to the inner diameter of the second subchannel ranges from 1.05 to 3.0.

4. The blower of claim 1, wherein a bottom of the scroll casing is provided with a cover plate; the air inlet is disposed on a central part of the cover plate; the air outlet is disposed on a side surface of the scroll casing; and a plurality of annular lug bosses is disposed on an inner side wall surface of the cover plate and centers around the air inlet.

5. The blower of claim 4, wherein a height of the annular lug bosses is gradually decreased from a center of the cover plate to an outer edge of the cover plate.

6. The blower of claim 5, wherein a cross-section of the annular lug bosses is triangular or trapezoidal.

7. The blower of claim 4, wherein an outer edge of the inner side wall surface of the cover plate is provided with an annular baffle; and a bottom of the fan impeller is inserted into the annular baffle.

8. The blower of claim 7, wherein a top of the annular baffle is provided with a filleted corner.

* * * * *